Mar. 13, 1923.

C. SANNER.
LUBRICATOR.
FILED MAY 11, 1922.

1,448,041.

Celestin Sanner.
INVENTOR

BY Alfred T. Bratton
ATTORNEY

H. K. WHEELER.
WITNESS:

Patented Mar. 13, 1923.

1,448,041

UNITED STATES PATENT OFFICE.

CELESTIN SANNER, OF PHILADELPHIA, PENNSYLVANIA, ASSIGNOR TO SANNER BROTHERS INCORPORATED, OF PHILADELPHIA, PENNSYLVANIA.

LUBRICATOR.

Application filed May 11, 1922. Serial No. 560,171.

*To all whom it may concern:*

Be it known that I, CELESTIN SANNER, a citizen of the United States of America, residing at Philadelphia, in the county of Philadelphia and State of Pennsylvania, have invented new and useful Improvements in Lubricators, of which the following is a specification.

This invention relates to lubricators and it has more particular reference to oil cups such as are usually employed upon machines and the like which are subject to varying degrees of vibration, the primary object thereof being to provide a lubricator or oil cup the feed wherefrom is in the nature of a "splash" dependent functionally upon and automatically varying in direct relation to the degree of vibration of the part on which said lubricator or oil cup is mounted. In other words, this invention aims to provide a lubricator or oil cup which when mounted on a piece of machinery or the like that is subject to varying or a constant degree of vibration, the part or parts lubricated thereby will be automatically supplied with lubricant in direct proportion to its need; that is to say when the part lubricated is slightly vibrated the feed of lubricant will be comparatively slow or according to accepted requirement to keep said part properly lubricated; and on the other hand when said part is subject to a higher degree of vibration the supply of lubricant will automatically increase in direct proportion consonant with proper lubrication or the increased Fahrenheit temperature of said part resulting from a higher velocity of the rotating or reciprocating member being lubricated.

Another object of this invention is to provide a vibratory splash-feed lubricator which is devoid of any valve elements while at the same time it is of a character that is automatic and positive in its action when applied to the vibrating parts of machines or engines.

A further object of this invention is to provide a lubricator or oil cup characterized by the fact that the lubricant creates its own seal or cut-off, when the movable or vibrating part on which said lubricator or oil cup is mounted comes to a condition or state of rest.

A still further object attained by this invention is the provision of a splash-feed vibratory lubricator which includes a minimum number of parts, the same being of a character and design that ensures ease in their manufacture and assembly, with a resultant saving in time and labor in production.

With the foregoing and other objects in view as will be more apparent from the following description my invention consists essentially of an oil cup or lubricator provided with a sealing pan having apertures therethrough for the discharge of lubricant when said oil cup or lubricator is subjected to vibration, in combination with a superposed dished diaphragm having an outlet in direct transverse alignment with the aforesaid apertures in the sealing pan whereby an automatic cut-off of the lubricant inheres when the device is at rest.

In the further disclosures of the invention reference is to be had to the accompanying sheet of drawings illustrative of one practical embodiment of my invention, and in which like characters of reference designate the same or corresponding parts in all the views.

Figure 3 is a top plan view of the dished diaphragm hereinafter more fully described; and, Figure 4 is a plan view of the sealing pan likewise later on more particularly referred to.

Figure 1:
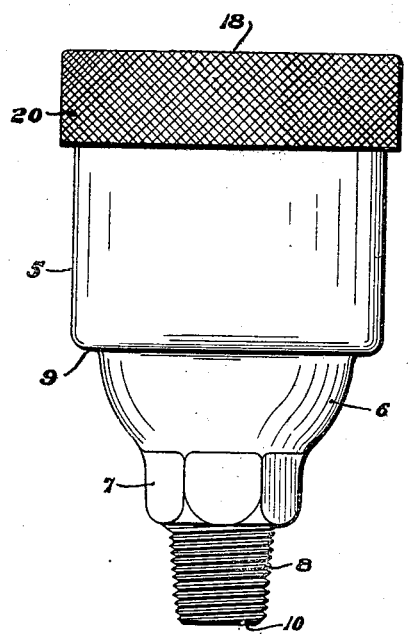
Figure 1 is an elevational view of an oil cup embodying my invention.

Referring more specifically to the drawings, the numeral 5 designates the main body portion or reservoir of my novel lubricator or oil cup the same being cylindrical and having an integrally formed lower extension 6 of concavo-convex formation appropriately fashioned with a polygonal and axial part 7 terminating in a screw-threaded nipple 8 by means of which the device can be readily secured in place or removed as desired. It is to be here particularly noted that the aforesaid concavo-convex part or lower extension 6 is of less diameter than that of the main body portion or reservoir 5 thus providing an internal shoulder or seat 9 for a purpose later on explained. Furthermore the extreme lower end of the screw threaded nipple 8 is closed in at 10 and axially holed at 11 to provide a discharge orifice for the lubricant.

Fitting easily within the main body portion or reservoir 5 and seating on the aforesaid shoulder 9 is what I term a sealing pan 12 which is preferably of the dished formation shown. This sealing pan 12 is appropriately made of thin sheet material, fashioned to provide a circumferential flange 13 that reposes on the aforementioned seat or shoulder 9 when the parts are assembled, while the main or inner part thereof is downwardly dished as clearly shown in Figure 2 so that it is disposed in spaced relation relative to the concavo-convex extension 6 of the reservoir 5. This sealing pan 12 is also provided below the flanged part 13 thereof with a plurality of laterally opposed holes or elongated apertures 14 for a purpose later on explained.

Figure 2:
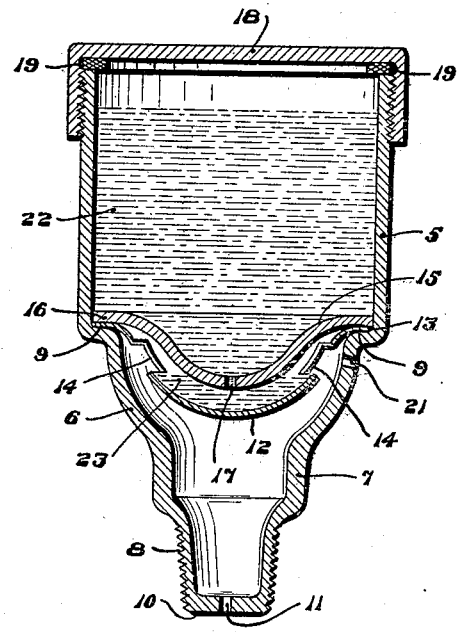
Figure 2 is a central vertical section through the oil cup shown by the preceding Figure.
Figure 3:
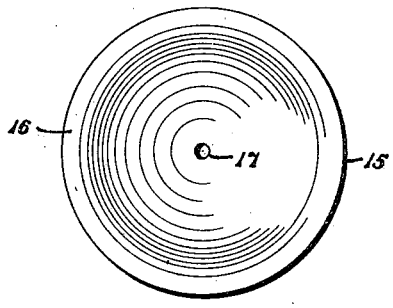
Figure 4:
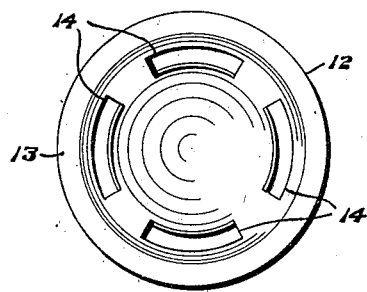

Seating a friction fit in the main body portion or reservoir 5 and adapted to hold the aforesaid sealing pan 12 firmly in place is a superposed dished diaphragm 15 having a lateral circumferential flange 16, and fashioned in vertical cross section to a dished contour as shown by Figure 2, so that when the parts are assembled it will be in spaced relation relative to the upper face of the sealing pan 12. It is also to be particularly noted that this dished diaphragm 15 is of a depth relative to that of the sealing pan 12, so that its inner lowermost level is in direct horizontal alignment or in a plane with the lower edges of the aforesaid holes or elongated apertures 14 in said sealing pan 12, while it is axially apertured at 17 to provide communication thereinto.

A cover or cap 18 is suitably screw threaded on to the top of the main body portion or reservoir 5 and it is internally fitted with a leather or other suitable material washer 19 that serves as a packing to create an air lock as between said cap or cover 18 and the reservoir 5. This cap or cover 18 is also appropriately knurled or serrated at 20 whereby a firm hold can be taken thereof to remove or replace said cap or cover 18 as desired, or when filling and refilling the reservoir 5.

An air vent 21 is provided below the sealing pan 12 but above the lower level of the holes elongated apertures 14 therein, and it serves for the automatic replacement of the air which bubbles up through the axial hole 17 as the lubricant 22 flows downwardly after each "splash" and thereby recreates the seal at the lever 23.

The assembly and functioning of my novel lubricator or oil cup as above described will be clearly apparent to those conversant with the art to which this invention appertains, while it will be obvious that I have provided an oil cup or lubricator comprising a minimum number of parts, in fact—excluding the washer 19—only four in number and all of which can be manufactured by die stamping or casting from sheet metal.

Furthermore, I wish to particularly emphasize the formation of the dished diaphragm 15 and an examination of Figure 2 more particularly will clearly establish the fact that the formation shown ensures the full weight or pressure of the lubricant being axially directed over the outlet 17. This feature is deemed of considerable importance as it effectively ensures the automatic action of the lubricator or oil cup until the main body portion or reservoir is completely emptied.

While there has been shown and described one practical embodiment of my invention, I wish it clearly understood that I do not limit myself to the precise details specifically set forth, as it will be perfectly obvious the same are susceptible of modification to adapt my said invention to different sizes and types of lubricators; the right is therefore hereby reserved to make all such changes and modifications as fairly lie within the scope of the appended claim.

Having described my invention, what I claim as new and desire to secure by Letters Patent is:

A lubricator comprising a reservoir of cylindrical form, a screw threaded nipple integral therewith, said nipple being of smaller diameter than the cylindrical portion at the punction therewith to provide a shoulder, the lowermost extremity of said nipple having a restricted opening for the passage of the lubricant, a sealing pan of concavo-convex cross section supported by the aforementioned shoulder, said sealing pan being of lesser diameter than the cylindrical portion of the reservoir, a dished diaphragm frictionally engaged with the walls of the cylindrical portion of the reservoir, said diaphragm being supported by the aforementioned shoulder, said sealing pan being held in position by said diaphragm, apertures in the walls of said sealing pan intermediate the centre and periphery thereof, and an air-tight seal for the reservoir.

In testimony whereof I affix my signature.

CELESTIN SANNER.